United States Patent [19]

Takagi

[11] Patent Number: 5,280,618
[45] Date of Patent: Jan. 18, 1994

[54] INTERRUPT TEST CIRCUIT FOR MICROPROCESSOR SYSTEM

[75] Inventor: Kiyoshi Takagi, Tokyo, Japan

[73] Assignee: Motorola, Inc., Schaumburg, Ill.

[21] Appl. No.: 482,607

[22] Filed: Feb. 21, 1990

[30] Foreign Application Priority Data

Feb. 27, 1989 [JP] Japan .................. 1-43223

[51] Int. Cl.⁵ ................................ G06F 9/46
[52] U.S. Cl. .................... 395/725; 395/700; 395/275; 364/DIG. 2; 364/941
[58] Field of Search ............ 364/DIG.; 395/700

[56] References Cited

U.S. PATENT DOCUMENTS

| | | | |
|---|---|---|---|
| 3,866,181 | 2/1975 | Gayman et al. | 340/172.5 |
| 4,024,505 | 5/1977 | Sperling | 340/172.5 |
| 4,090,238 | 5/1978 | Russo | 364/200 |
| 4,162,529 | 7/1979 | Suzuki et al. | 364/200 |
| 4,177,515 | 12/1979 | Jenkins et al. | 364/200 |
| 4,628,449 | 12/1986 | Zardiackas | 364/200 |
| 4,631,670 | 12/1986 | Bradley et al. | 364/200 |
| 4,733,366 | 3/1988 | Deyesso et al. | 364/900 |
| 4,885,682 | 12/1989 | Komoto | 364/200 |

*Primary Examiner*—Gareth D. Shaw
*Assistant Examiner*—Lucien Toplu
*Attorney, Agent, or Firm*—Jonathan P. Meyer

[57] ABSTRACT

An interrupt test circuit is provided on the same chip with a microprocessor system having a central processing unit, and an interrupt controller controlling execution of an interrupt operation of the central processing unit in response to an interrupt request signal from peripheral units. The interrupt test circuit is connected between the peripheral units and the interrupt controller and includes a test signal output connected to the interrupt controller, and storage means for storing an interrupt request test signal when receiving a predetermined signal and for supplying the test signal through the test signal output to the interrupt controller for interrupt performance test.

14 Claims, 3 Drawing Sheets

INTERRUPT TEST CIRCUIT FOR MICROPROCESSOR SYSTEM

FIELD OF THE INVENTION

The present invention relates, in general, to the field of digital data processing systems such as microprocessor systems and microcomputer systems. More particularly, the invention relates to an interrupt test circuit for a digital processing system which facilitates interrupt performance tests.

BACKGROUND OF THE INVENTION

The recent development of a microprocessor which is fabricated in the form of a MOS monolithic integrated circuit, has brought feasible and broad new range of many applications, including digital control functions such as numeric control, automotive control, elevator control, highway and rail traffic control and process control, and countless other applications within the fields of household appliances, transportation, medical electronics, test systems, and many others.

In the microprocessor system, a central processing unit (CPU) performs a master controller function since it executes stored program instructions and transmits and receives data and control signals required to perform over-all functions of the microprocessor system. The CPU sequentially executes instructions. In many applications, it is necessary to execute sets of instructions in response to request signals from various peripheral units. These requests are often asynchronous to the execution of the main program. Interrupts provide a way to temporarily suspend normal program execution so that the CPU can be freed to service these requests. After an interrupt has been serviced, the main program resumes as if there had been no interruption.

The instructions executed in response to an interrupt are called the interrupt service routine. These routines are much like subroutines except that they are called through the automatic hardware interrupt mechanism rather than by a subroutine call instruction, and all CPU registers are saved on the stack rather than just saving the program counter. An interrupt (provided it is enabled) causes normal program flow to be suspended as soon as the currently executing instruction finishes. The CPU then pushes the contents of all CPU registers onto the stack so that the CPU context can be restored after the interrupt is finished. After stacking the CPU registers, the CPU determines which request source has the highest priority if multiple interrupt requests occur, and then the vector for the highest priority pending interrupt source is loaded into the program counter. Other pending interrupt sources being not the highest are ignored. The CPU responds to the highest priority request source being executed to clear the highest interrupt request, and execution continues with the first instruction of the interrupt service routine. An interrupt is concluded with a return from interrupt (RTI) instruction, which causes all CPU registers and the return address to be recovered from the stack so that the interrupted program can resume as if there had been no interruption. If any interrupt request still exists, the CPU recognizes it and executes an interrupt again.

Interrupts can be enabled or disabled by an I-bit in the condition code register (CCR) and by local enable mask bits in the on-chip peripheral control registers. The I-bit in the CCR acts as a primary enable control for all maskable interrupts. When the I-bit is set, interrupts can become pending but will not be honored. When the I-bit is clear, interrupts are enabled to interrupt normal program flow when an interrupt source requests service.

An interrupt can be recognized at any time by the CPU, provided it is enabled. Once any interrupt source is recognized, the CPU will respond at the completion of the currently executing instruction. When the CPU decides to service an interrupt, the contents of CPU registers are pushed (stored) on the stack memory. The interrupt sequence then proceeds to the priority resolution step. After the contents of the registers have been stacked, the CPU evaluates all pending interrupt requests to determine which source has the highest priority. The interrupt sources usually have a fixed hardware-priority interrupt relationship.

When an interrupt has been serviced as needed, the CPU returns to the program that was running at the time of the interruption. During servicing of the interrupt, some or all of the CPU registers will have changed. To continue the former program as if it had not been interrupted, the registers must be restored to the values present at the time the former program was interrupted.

In order to ascertain whether such complex interrupt service is properly performed, it is necessary to carry out two performance tests defined below:

(1) Peripheral test: a test for confirming whether peripheral units provide the proper interrupt request signals; and (2) CPU test: a test for confirming whether the CPU properly executes an interrupt operation when receiving interrupt request signal(s).

However, there are several problems in carrying out both performance tests. Because the peripherals and the CPU are directly connected through interrupt request lines, whenever the Peripheral test should be done, the CPU necessarily executes the interrupt service. In other words, the Peripheral test can not be done without the actual interrupt execution, and therefore much time and troublesome procedure are required.

In the CPU test, there is a need to cause all peripheral units to actually provide their interrupt request signals concurrently, sequentially and in other ways. Accordingly, the CPU test requires a very complex test procedure and much amount of time, and further requires a variety of complex test programs for each microprocessor chip having different sets of peripherals.

SUMMARY OF THE INVENTION

Accordingly, it is an object of the present invention to provide an interrupt test circuit for a microprocessor system which requires the minimum time and procedure for interrupt performance tests.

More particularly, it is an object of the present invention to provide an interrupt test circuit for a microprocessor system which facilitates interrupt performance tests, in which both the Peripheral and CPU tests can be easily carried out independently and precisely with the minimum time and procedure.

Briefly described, the present invention includes an interrupt test circuit for a microprocessor system having a central processing unit (CPU), and an interrupt controller for controlling execution of an interrupt operation of the central processing unit in response to an interrupt request signal from peripheral units. The interrupt test circuit is connected between the peripheral units and the interrupt controller in one embodiment.

The interrupt test circuit comprises a test signal output connected to the interrupt controller, and storage means for storing an interrupt request test signal under control of the central processing unit and for supplying the test signal through the test signal output to the interrupt controller for CPU interrupt performance tests. In a particular embodiment, the interrupt test circuit further comprises gate means having an input connected to the request signal output of the peripheral unit and transmitting the request signal to a data bus for peripheral interrupt performance tests.

These and other objects and advantages will be apparent to one of skill in the art from the detailed description below taken together with the drawings.

DETAILED DESCRIPTION OF THE INVENTION

Figure 5:
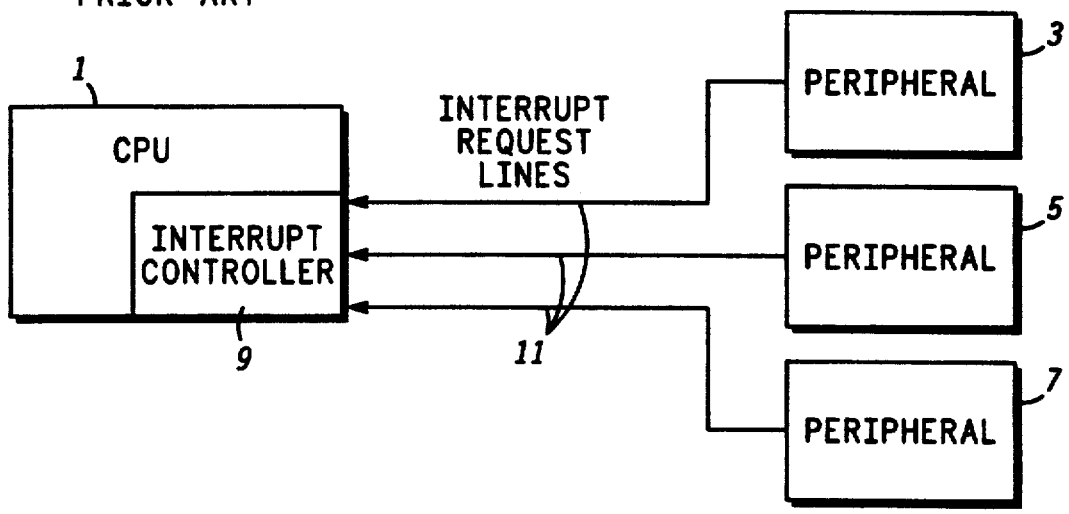
FIG. 5 is a block diagram of a prior microprocessor system illustrating the connection between peripheral units and an interrupt controller in a CPU.

To facilitate understanding the present invention, a brief reference will be made to a conventional microprocessor system. The block diagram of FIG. 5 represents the connecting relation of a central processing unit (CPU) 1 and peripheral units 3, 5 and 7 in a prior microprocessor system.

CPU 1 performs a master controller function and sequentially executes stored program instructions. CPU 1 includes an interrupt controller 9 which functions to control the execution of interrupt service of CPU 1 in response to receiving an interrupt request signal. CPU 1 also has several kinds of registers such as an index register, a condition code register (CCR), a program counter, etc., although they are not shown. An interrupt mask bit I (not shown) in the condition code register (CCR) can be used to inhibit all maskable interrupts.

On-chip peripheral units 3, 5 and 7 as interrupt sources are connected to CPU 1 by interrupt request lines 11. Examples of the peripheral units include a free running timer, a serial communication interface (SCI), a direct memory access controller, etc.. Peripheral units 3, 5 and 7 can generate hardware maskable interrupt request signals which are transmitted through interrupt request lines 11 to interrupt controller 9. The maskable interrupt request signals are recognized only if the interrupt mask bit I in the condition code register (CCR) is clear. The maskable interrupts are hardware-prioritized according to a default arrangement determined by request lines 11.

Peripheral units 3, 5 and 7 have software-accessible control bits (not shown) to enable or disable the generation of their interrupt request signals on an individual basis. Programmers can decide which peripheral units will be used to generate interrupts.

The interrupt request signal requests that an interrupt sequence be generated within CPU 1. CPU 1 will wait until it completes the current instruction that is being executed before it recognizes the request signal. At that time, if the interrupt mask bit I in the CCR is not set, CPU 1 will begin an interrupt sequence. The contents of the index register, program counter, accumulators and condition code register are then stored away on the memory stack during the interrupt sequence. Next CPU 1 responds to the interrupt request by setting the interrupt mask bit I high so as to inhibit nested interrupts, and evaluates all pending interrupt requests to determine which peripheral unit has the highest priority.

Because the peripheral units 3, 5 and 7 of the prior microprocessor system are connected directly to CPU 1, whenever the Peripheral test is carried out, CPU 1 actually executes the interrupt sequence. Therefore, the Peripheral test can never be done without the actual interrupt execution, resulting in much time consuming and troublesome procedure. In the CPU test, the prior microprocessor system causes peripheral units 3, 5 and 7 to actually provide their interrupt request signals concurrently, sequentially and in other modes. Specially, when checking the CPU interrupt service responding to multiple interrupt requests, it is required for all peripherals to continue providing their request signals until the CPU finishes all interrupt services. This requirement is very difficult. Accordingly, the CPU test needs very complex test procedure and much amount of time, and further needs a variety of complex test programs to be prepared individually for each type of microprocessor chip having a different set of peripherals.

Figure 1:
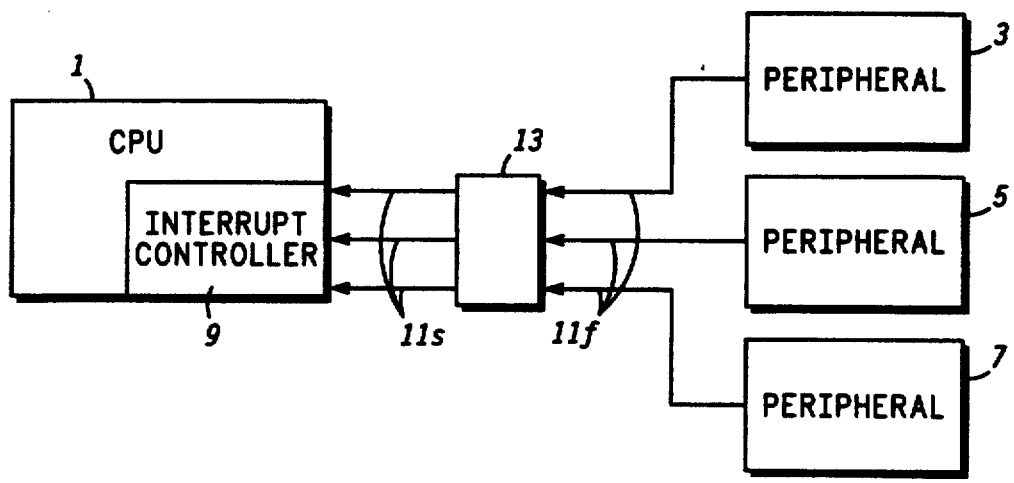
FIG. 1 is a block diagram of a microprocessor system having interrupt test circuitry according to one embodiment of the present invention.
Figure 2:
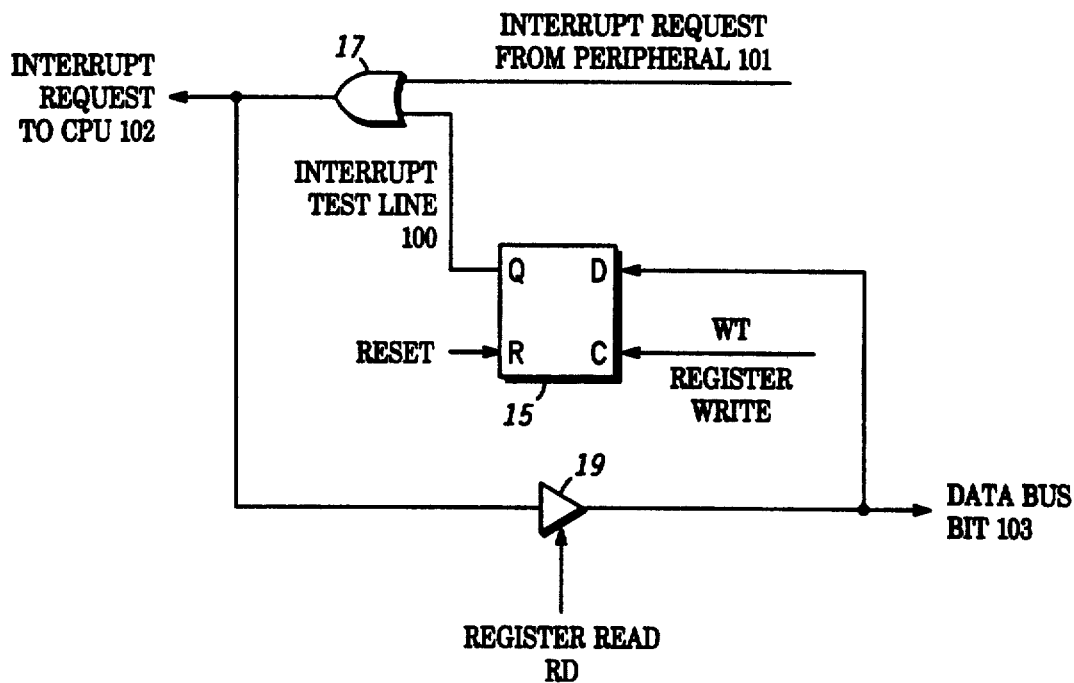
FIG. 2 is an example of a logic diagram of the interrupt test circuitry shown in FIG. 1.
Figure 3:
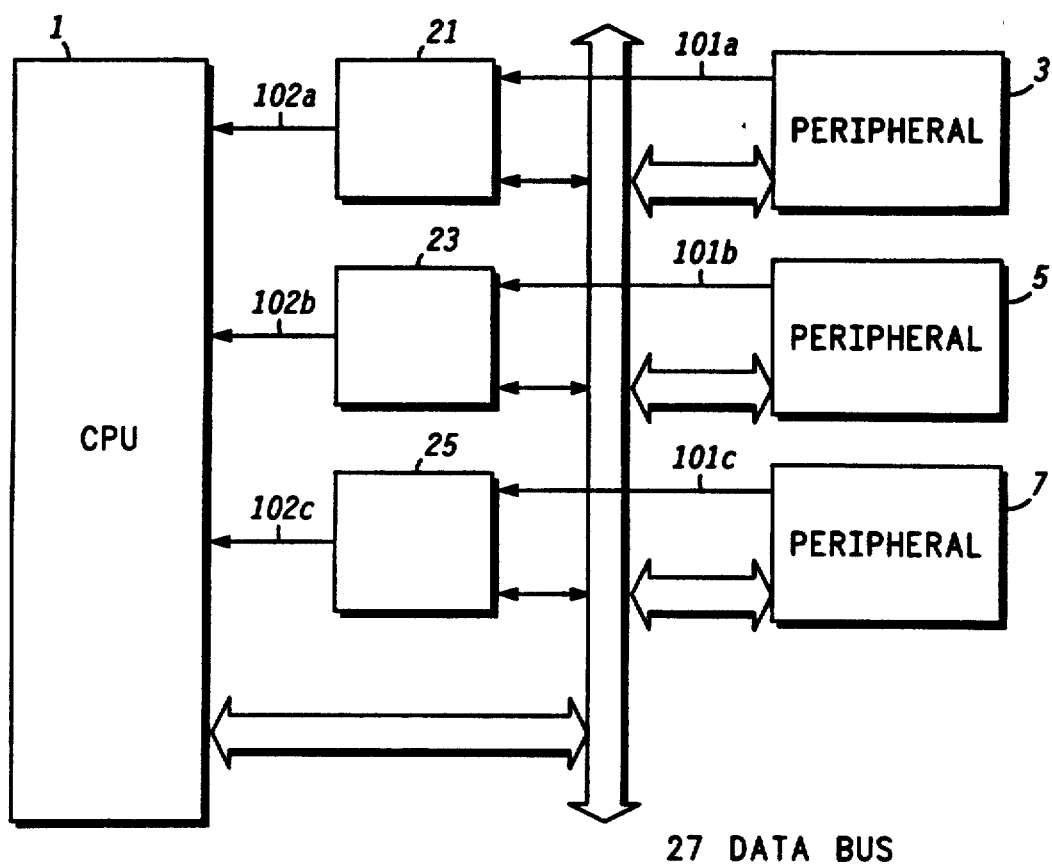
FIG. 3 is a block diagram illustrating several interrupt test circuits as shown in FIG. 2 connected between peripheral units and a CPU.

The interrupt test circuit according to the present invention will now be described in detail with reference to a preferred embodiment thereof, which is illustrated in FIGS. 1, 2 and 3. Shown in FIG. 1 is a block diagram of a microprocessor system according to the present invention. A microprocessor system is a specific example of a more general digital data processing system. It should be understood that the term "a digital data processing system" used herein is intended to include a microprocessor system, a microcontroller system, a microcomputer system and other integrated controlling systems which have interrupt functions. Similar reference numerals indicate corresponding units or parts throughout the several views of the drawings.

In this embodiment, interrupt test circuitry 13 is coupled between a central processing unit (CPU) 1 and peripheral units 3, 5 and 7. More specifically, request signal outputs of peripheral units 3, 5 and 7 are connected to interrupt test circuitry 13 by first interrupt request lines 11f. Test signal outputs of interrupt test circuitry 13 are connected to request signal inputs of an interrupt controller 9 in CPU 1 by second interrupt request lines 11s. Accordingly, interrupt request signals generated in peripheral units 3, 5 and 7 are not connected directly to interrupt controller 9 in this embodiment. Instead, interrupt test circuitry 13 can read the interrupt request signals and send them to interrupt controller 9.

FIG. 2 shows a preferred embodiment of a logic diagram for one-bit of interrupt test circuitry 13 of FIG. 1. The one-bit interrupt test circuit includes an OR gate 17, a register 15 as storage means and a gate 19. OR gate 17 has two inputs, one of which is connected through one of first interrupt request lines 11f to the request signal output of one of peripheral units 3, 5, or 7 to receive an interrupt request signal 101. The other input of OR gate 17 is connected to a Q output of register 15 to receive an interrupt test signal 100. A request signal or a test signal is present at an output of OR gate 17, which test signal is connected through one of second interrupt request lines 11 to one of the request signal inputs of interrupt controller 9, and sends an interrupt request signal 102 to interrupt controller 9.

Register 15 is a specific example of storage means which term is intended to include other storing devices such as a D flip-flop, a latch, a memory cell, etc. Register 15 has a D input connected to one bit of a data bus to receive data 103. Data 103 is written (stored) in register 15 as an interrupt test signal when a register write signal (WT) becomes active, for example, logically high. Interrupt test signal 100 being, for example active high, is transmitted through the Q output terminal and OR gate 17 to interrupt controller 9, where it functions as a pseudo request signal. Register 15 can be reset by making reset input signal R active.

The output of OR gate 17 is also connected to the one bit of the data bus via a gate 19 which is enabled by making a read signal (RD) active. Therefore, the output of OR gate 17 can be read out through the data bus.

FIG. 3 shows a block diagram of a microprocessor system which incorporates three interrupt test circuits as shown in FIG. 2. Interrupt test circuits 21, 23 and 25 are connected between peripheral units 3, 5 and 7 and CPU 1. Interrupt test circuits 21, 23 and 25 receive interrupt request signals 101a, 101b and 101c from peripheral units 3, 5 and 7, respectively, and send out signals 102a, 102b and 102c to CPU 1. Signals 102a, 102b and 102c are the actual interrupt request signals or the interrupt test signals. Interrupt test circuits 21, 23 and 25 are also connected to data bus 27 for reading and writing the request signals.

The operation of the interrupt test circuit for interrupt performance tests according to the present invention will now be described with reference to FIGS. 4A and 4B.

Figure 4A:
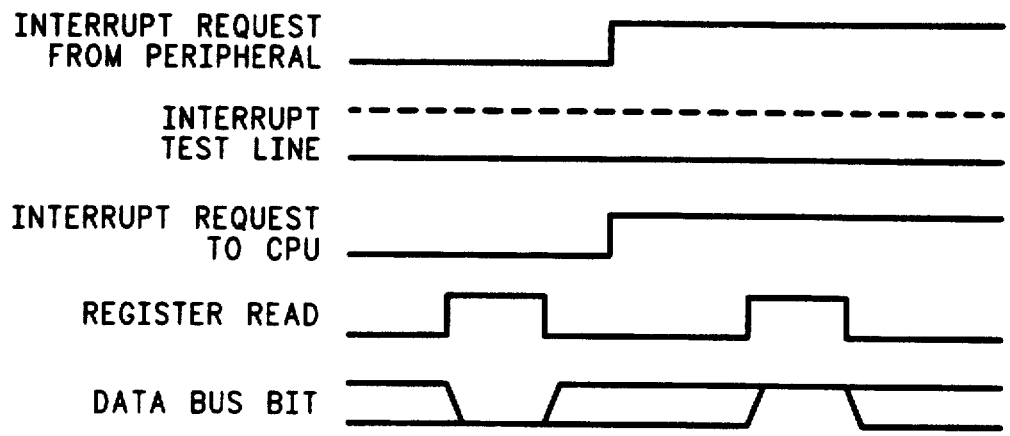
FIG. 4A is a timing diagram descriptive of the Peripheral test cycle in the interrupt performance tests according to the present invention.

Peripheral Test (FIG. 4A)

The interrupt is disabled or inhibited in interrupt controller 9 by setting the interrupt mask bit I in the CCR in CPU 1. Register 15 is reset so that interrupt test signal 100 is kept logically low at Q output. Each peripheral unit is caused to generate its interrupt request signal 101 one by one or concurrently. If each peripheral unit properly generates the interrupt request signal 101, then signal 102 at the output of corresponding OR gate 17 becomes active, which can be read on corresponding data bus bit 103 by making RD signal high.

Figure 4B:
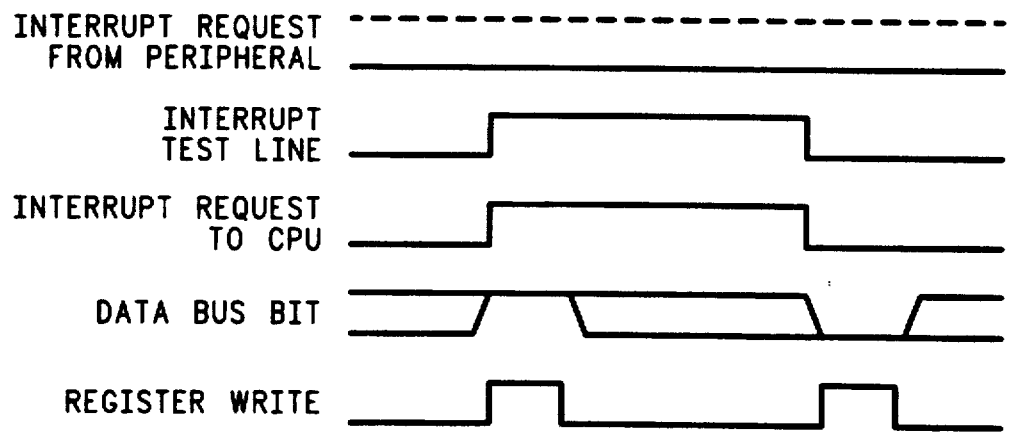
FIG. 4B is a timing diagram descriptive of the CPU test cycle in the interrupt performance tests according to the present invention.

CPU Test (FIG. 4B)

All interrupt request lines 101 are maintained inactive for example by setting the internal control bits in peripheral units. Interrupt test data is supplied on data bus 103, and is written in register 15 when WT signal is received. Register 15 holds the data 103 and supplies it as interrupt test signal 100 to OR gate 17, which sends out interrupt test signal or pseudo request signal 102 to interrupt controller 9. In this manner, any data can be written into registers 21, 23 and 25 via data bus 27 for carrying out the CPU test using a variety set of request signals. For example, when testing the CPU interrupt execution responds to multiple interrupt requests, it is enough to simply write the register once with the data having all "1". The execution of interrupt in CPU 1 can be easily confirmed by observing the contents in CCR, or data or address bus information.

ADVANTAGE

The interrupt test circuit for a microprocessor system according to the present invention eliminates the necessity of preparing many kinds of performance test programs which were conventionally required for a variety of chips having different sets of peripherals. The interrupt test circuit for a microprocessor system according to the present invention facilitates the interrupt performance tests, in which both the Peripheral and CPU tests can be easily carried out independently and precisely with the minimum time and easiest procedure.

While the present invention has been shown and described with reference to a particular embodiment thereof, various modifications and changes thereto will be apparent to those skilled in the art and are within the spirit and scope of the present invention.

What is claimed is:

1. A digital data processing system comprising:
   a central processing unit:
   an interrupt controller having a request signal input for controlling execution of an interrupt operation of said central processing unit in response to an interrupt request signal;
   a peripheral unit having a request signal output for providing an interrupt request signal to the request signal input of the interrupt controller; and
   a n interrupt test circuit, said interrupt test circuit including:
   test signal input circuitry connected to a test signal input to receive an interrupt test signal, the test signal input circuitry is not coupled to the request signal output of the peripheral unit;
   test signal output circuitry connected to the request signal input of the interrupt controller, and
   storage means having an input coupled to the test signal input circuitry for storing the interrupt request test signal when receiving a first control signal at a control signal input, and having an output coupled to the test signal output circuitry for supplying the interrupt test signal through the test signal output circuitry to the request signal input of the interrupt controller.

2. A digital data processing system according to claim 1 wherein said control signal input of said storage means is coupled to an output of the central processing unit.

3. A digital data processing system according to claim 1 further comprising a data bus coupled to the central processing unit and to the test signal input circuitry of the interrupt test circuit.

4. A digital data processing system according to claim 1 wherein said test signal output circuitry further comprises an input coupled to the interrupt request signal output of the peripheral unit and means for transmitting the interrupt request signal received from the peripheral unit to the interrupt controller when the interrupt request signal is received.

5. A digital data processing system according to claim 4 wherein said interrupt test circuit further comprises an OR gate having two inputs receiving the interrupt request signal from the peripheral unit and the test signal from the storage means respectively, and having one output connected to the request signal input of the interrupt controller.

6. A digital data processing system according to claim 4 wherein said interrupt test circuit further comprises gate means having an input connected to the request signal output of the peripheral unit for sensing the request signal under control of the central processing unit.

7. A digital data processing system according to claim 6 wherein said gate means transmits the request signal to a data bus when receiving a read signal from the central processing unit.

8. A digital data processing system including, a central processing unit, an interrupt controller included in the central processing unit and having a request signal input, for controlling execution of an interrupt operation of said central processing unit in response to an interrupt request signal, a plurality of peripheral units each having a request signal output for providing an interrupt request signal, and a plurality of interrupt test circuits,
- each of said interrupt test circuits being connected between the request signal output of one of the peripheral units and the interrupt controller, and receiving the interrupt request signal from the corresponding peripheral unit for transmitting the interrupt request signal to the interrupt controller, each of said interrupt test circuits comprising:
- a test signal output connected to the request signal input of the interrupt controller;
- a register means having a write signal input for receiving a write signal from the central processing unit, and having a test signal input for receiving a test signal, the test signal input is not coupled to any of the request signal outputs of the peripheral units, said register means stores the test signal when receiving the write signal and supplies the test signal to an output of the register means;
- an OR gate having two inputs receiving the interrupt request signal from the one of the peripheral units and the test signal from the output of the register means respectively, and having one output connected to the test signal output.

9. A digital data processing system comprising:
a data bus;
a central processing unit coupled to the data bus and having an interrupt request input;
a peripheral unit having an interrupt request output; and
an interrupt test circuit having a write control input, the interrupt test circuit further comprising:
- storage means coupled to the data bus and to the write control input for storing a data value received from the data bus when a first control signal is received at the write control input, the storage means having an output; and
- interrupt signal generator means having an input coupled to the interrupt request output of the peripheral, an input coupled to the output of the storage means and having an output coupled to the interrupt request input of the central processing unit for generating an interrupt request signal when an interrupt request signal is received from the peripheral unit or when the output of the storage means is in a first state.

10. A digital data processing system according to claim 9 wherein the central processing unit is coupled to provide the first control signal to the write control input of the interrupt test circuit.

11. A digital data processing system according to claim 10 wherein the central processing unit provides the data value to the data bus.

12. A digital data processing system according to claim 9 wherein the interrupt test circuit has a read control input and further comprises:
- read means having an input coupled to the output of the interrupt signal generator means, an input coupled to the read control input and an output coupled to the data bus for providing an output signal having a value determined by the output of the interrupt signal generator means to the data bus when a second control signal is received at the read control input.

13. A digital data processing system according to claim 12 wherein the central processing unit is coupled to provide the first and second control signals to the write control input and read control input, respectively, of the interrupt test circuit.

14. A digital data processing system according to claim 13 wherein the central processing unit provides the data value to the data bus and receives the output signal from the data bus.

* * * * *

UNITED STATES PATENT AND TRADEMARK OFFICE
CERTIFICATE OF CORRECTION

PATENT NO. : 5,280,618

DATED : January 18, 1994

INVENTOR(S) : Kiyoshi Takagi

It is certified that error appears in the above-identified patent and that said Letters Patent is hereby corrected as shown below:

Column 6, line 31, change "a n" to --an--

Signed and Sealed this

Twelfth Day of July, 1994

Attest:

BRUCE LEHMAN

*Attesting Officer*     *Commissioner of Patents and Trademarks*